United States Patent
Malcolm

(10) Patent No.: US 7,962,765 B2
(45) Date of Patent: Jun. 14, 2011

(54) METHODS AND SYSTEMS FOR TAMPER RESISTANT FILES

(75) Inventor: David H. Malcolm, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 912 days.

(21) Appl. No.: 11/763,413

(22) Filed: Jun. 14, 2007

(65) Prior Publication Data
US 2008/0313475 A1    Dec. 18, 2008

(51) Int. Cl.
G06F 12/14    (2006.01)
H04L 9/30    (2006.01)

(52) U.S. Cl. .................. 713/193; 380/30; 713/194

(58) Field of Classification Search .............. 713/193, 713/194; 380/30
See application file for complete search history.

(56) References Cited

U.S. PATENT DOCUMENTS

| | | | |
|---|---|---|---|
| 2005/0198517 A1* | 9/2005 | Ivanov et al. | 713/187 |
| 2006/0021064 A1* | 1/2006 | England et al. | 726/27 |
| 2006/0098824 A1* | 5/2006 | Mao | 380/282 |
| 2007/0016801 A1* | 1/2007 | Bade et al. | 713/193 |
| 2007/0232316 A1* | 10/2007 | Reda et al. | 455/445 |

* cited by examiner

Primary Examiner — Kambiz Zand
Assistant Examiner — Aubrey H Wyszynski
(74) Attorney, Agent, or Firm — MH2 Technology Law Group LLP

(57) ABSTRACT

Embodiments of the present invention provide a tamper proof file system. In particular, the present invention utilizes a virtual block device that is coupled with a real block device and a private/public key pair. The virtual block device receives the original data and then digitally signs it with the private key. The virtual block device then passes the digitally signed data to the real block device for storage. In order to retrieve or verify the data, the virtual block device may provide the public key and an acknowledgment. The acknowledgment may include a hash of the public key. The virtual block device is configured to discard the private key and to be removed from the system based on a finite lifespan.

20 Claims, 4 Drawing Sheets

METHODS AND SYSTEMS FOR TAMPER RESISTANT FILES

FIELD OF THE INVENTION

The present invention relates to data storage, and more particularly, it relates to tamper resistant file systems.

BACKGROUND OF THE INVENTION

In view of the increasing use of digital technologies, protecting data continues to grow in importance. Whether preventing unauthorized access to data, ensuring compliance with various laws, or guaranteeing the integrity of a document, there is a need for securing digital information. As more and more files are archived on digital medium, the requirement to provide secure storage has become more important.

One of the main technologies used to protect files on a digital medium is public key cryptography, which relies on a public key paired with a public key. All public key/private key cryptosystems depend entirely on keeping the private key secret. A private key can be stored on a user's computer system. However, the security of the private key completely depends on the security of that system. Unfortunately, many computer systems and operating systems can be compromised, thus exposing the private key to attack.

A more secure alternative is to store the private key on a smart card. Many smart cards are tamper resistant. However, many smart card designs have been broken. In addition, deploying and managing smart cards can be difficult. Smart cards must be fabricated and distributed to users. In addition, smart cards can be lost or stolen. Furthermore, smart cards usually require additional equipment and software.

Accordingly, it would be desirable to provide methods and systems that can secure sensitive data. It would also be desirable to provide methods and systems for providing tamper resistant storage of digital files.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide a tamper proof file system. In particular, the present invention utilizes a virtual block device that is coupled with a real block device and a private/public key pair. The virtual block device receives the original data and then digitally signs it with the private key. The virtual block device then passes the digitally signed data to the real block device for storage. In order to retrieve or verify the data, the virtual block device may provide the public key and an acknowledgment. The acknowledgment may include a hash of the public key. The virtual block device is configured to discard the private key and to be removed from the system based on a finite lifespan.

Figure 1:
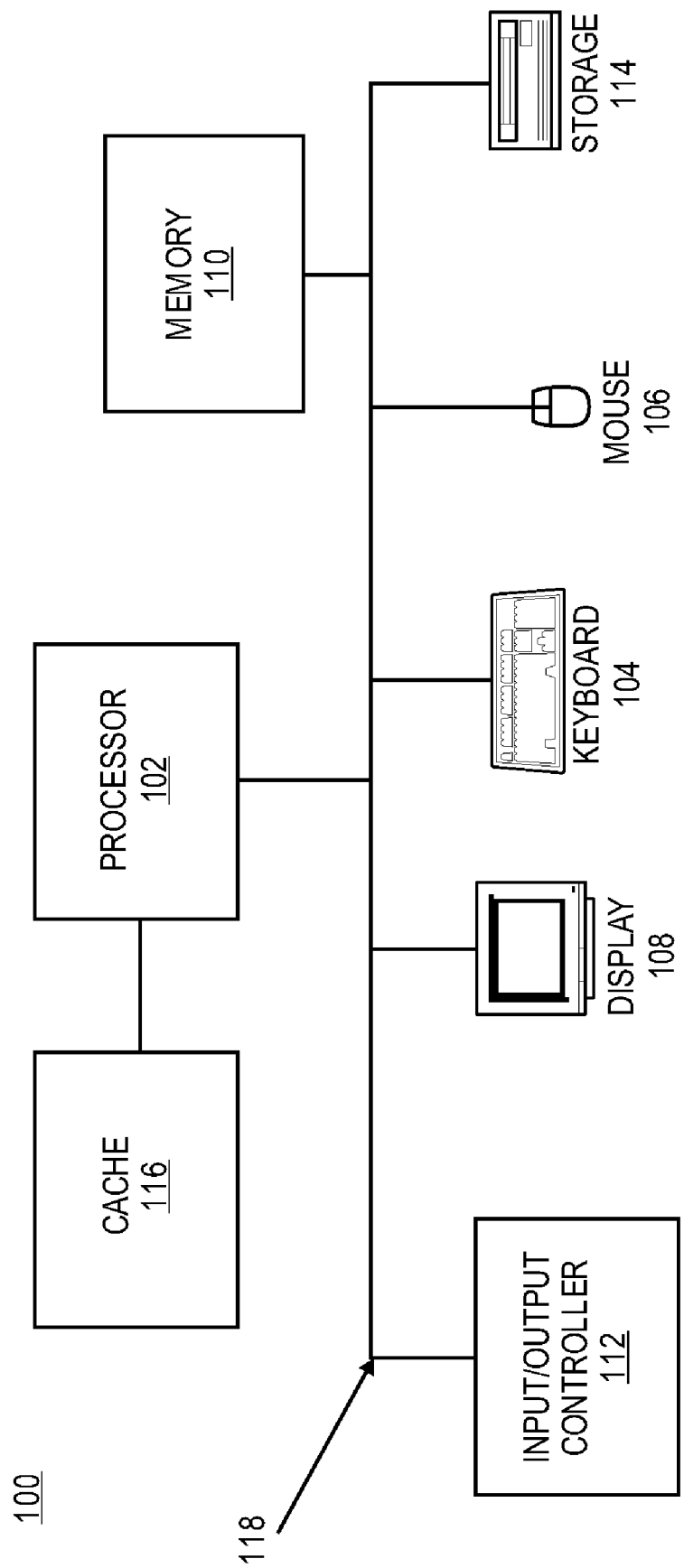
FIG. 1 illustrates an exemplary system in which the present invention may be implemented.
Figure 2:
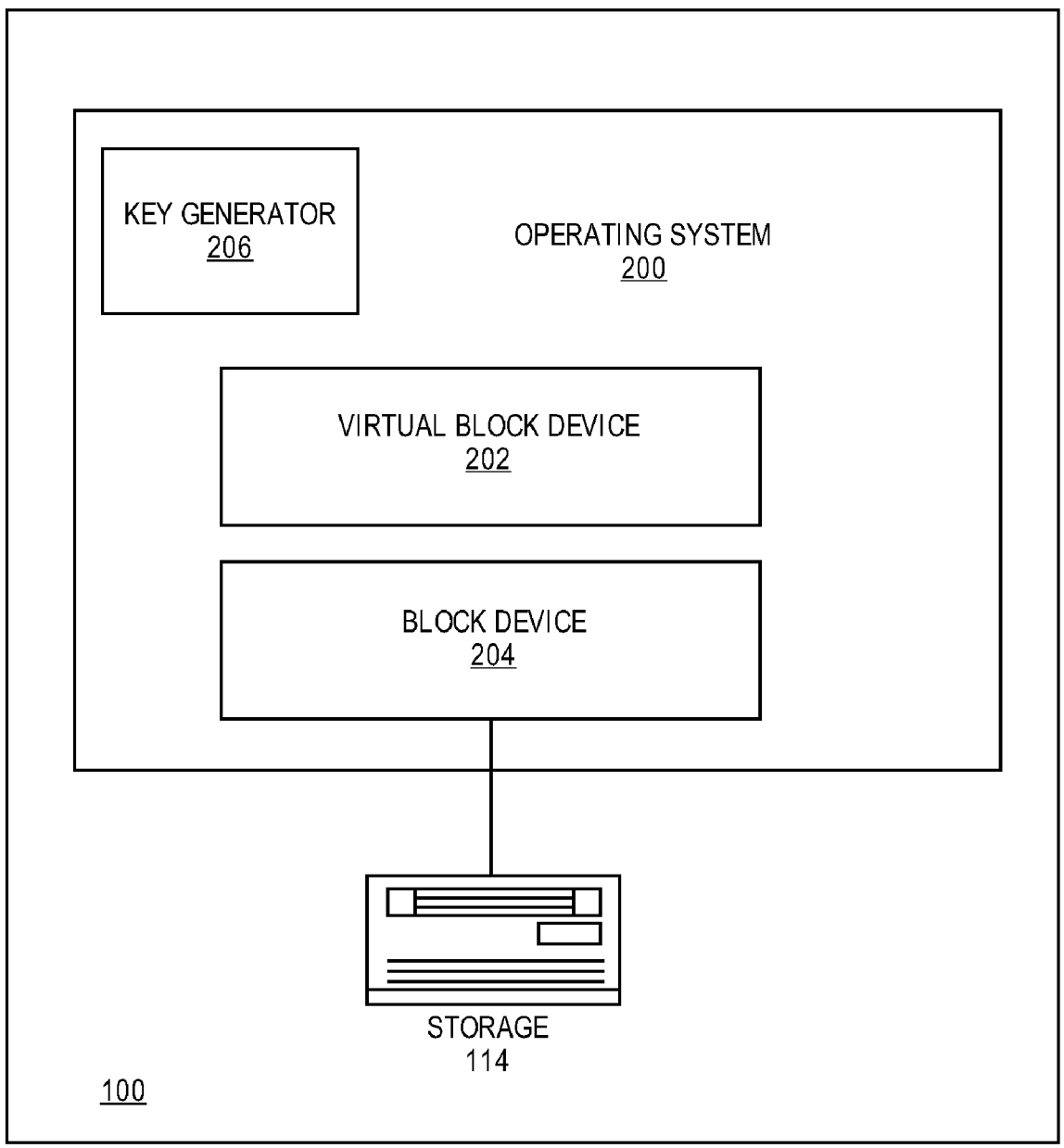
FIG. 2 illustrates an exemplary architecture for the present invention.
Figure 3:
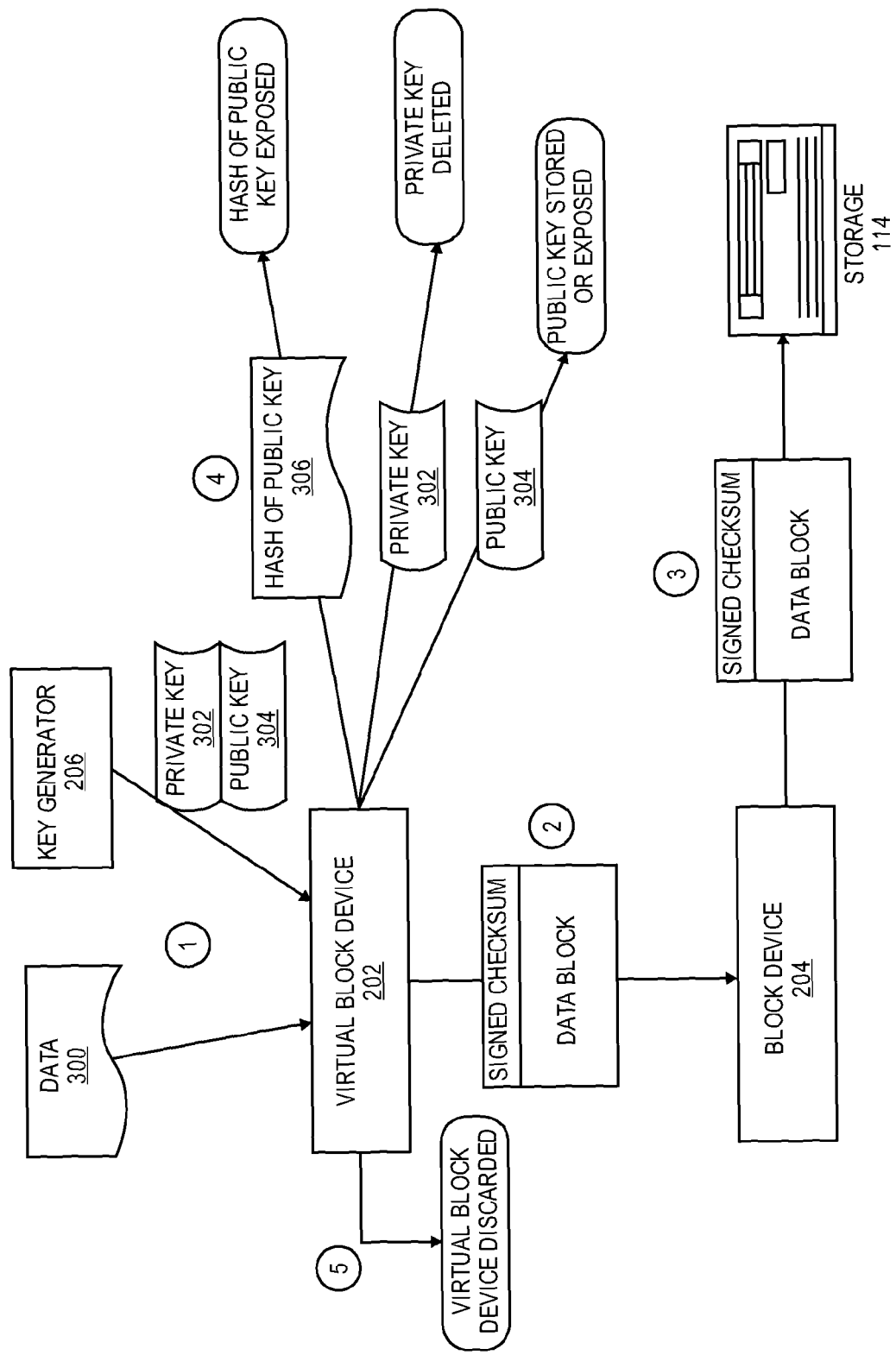
FIG. 3 illustrates an exemplary process flow for storing data in a tamper-resistant manner.
Figure 4:
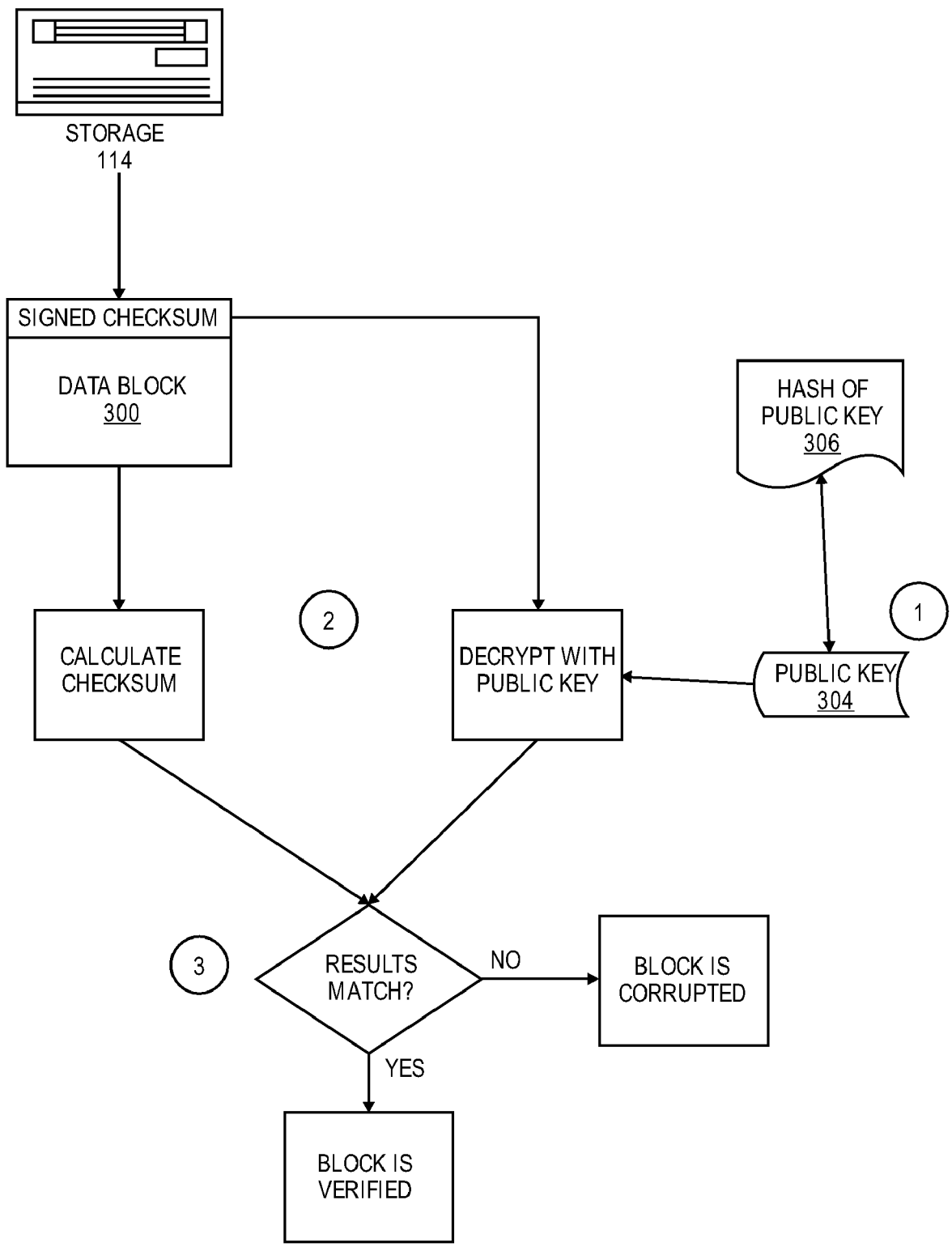
FIG. 4 illustrates an exemplary process flow for verifying or retrieving data in accordance with the present invention.

Reference will now be made in detail to the exemplary embodiments of the invention, which are illustrated in the accompanying drawings. FIG. 1 illustrates a typical computer system in which the present invention may be employed. FIG. 2 illustrates the general architecture used by the present invention, which is based on a virtual block device coupled to a real block device. FIG. 3 illustrates a process flow for storing data in a tamper-resistant manner and FIG. 4 illustrates a process flow for retrieving or verifying stored data. Wherever possible, the same reference numbers will be used throughout the drawings to refer to the same or like parts.

FIG. 1 illustrates a computer system 100 that is consistent with the principles of the present invention. For purposes of explanation, FIG. 1 illustrates a general purpose computer, such as a personal computer, which may implement embodiments of the present invention. Examples of the components that may be included in computer system 100 will now be described.

As shown, a computer system 100 may include a central processor (CPU) 102, a keyboard 104, a pointing device 106 (e.g., mouse, or the like), a display 108, a main memory 110, an input/output controller 112, and a storage device 114. Processor 102 may further include a cache memory 116 for storing frequently accessed information and graphics processing unit 118. Cache 116 may be an "on-chip" cache or external cache. System 100 may also be provided with additional input/output devices, such as a printer (not shown). The various components of the system 100 communicate through a system bus 118 or similar architecture. One skilled in the art will recognize that the present invention can be employed in virtually any type of computing device in which secure storage of sensitive data is desired. Such devices, for example, may include mobile phones, kiosks, voting machines, and the like.

FIG. 2 illustrates an exemplary architecture for the present invention. As shown, computer system 100 may be running an operating system 200 that utilizes a virtual block device 202, a real block device 204, and a key generator 206 to store data in a secure manner.

Operating system 200 is a set of programs that manage the hardware (as shown in FIG. 1) and software resources of system 100. For example, operating system 200 may performs tasks, such as controlling and allocating memory, prioritizing system requests, controlling input and output devices, and managing file systems. Several operating systems are well known to those skilled in the art, such as Windows from the Microsoft Corporation, Linux, Unix, Mac OS from Apple Computer Corporation, and the like.

Virtual block device 202 is configured to emulate transparent communication between the applications running and the hardware of system 100, such as storage device 114. Virtual block device 202 is used to correspond to devices through which data is transmitted in the form of blocks, and thus, data can be handled in discrete, fixed size units.

Virtual block device 202 is considered "virtual" because it serves as an emulation of real block device 204 and has a finite lifespan. Virtual block device 202 includes the normal input and output routines of a real block device. However, virtual block device 202 is instantiated for only a limited period of time and also utilizes public key cryptography to secure the blocks of data it handles. Once its lifespan has passed, virtual block device 202 is deleted from computer system 100 and, if needed, a new virtual block device is initiated in its place. The lifespan of virtual block device 202 may be determined in a variety of ways. For example, virtual block device 202 may have a predetermined time interval for its lifespan. Alternatively, the lifespan of virtual block device 202 may start and stop with the running of a particular application or when system 100 shuts down or starts up. For example, a voting machine, or a secure server might use the virtual block device to store results or logging information, which only needs to be writable for a short duration of time, but may need to be read from over a much longer period. Other applications of the present invention will be apparent to those skilled in the art.

Real block device 204 is the real block device that is coupled to virtual block device 202. In particular, real block device 204 receives the output of virtual block device 202 and writes it to its corresponding device. For example, real block device 204 may correspond to storage device 114 and transmit the output of virtual block device 202 to storage device 114.

Alternatively, real block device 204 and storage 114 can be replaced with other nested virtual devices, such as a RAID driver that talks to multiple underlying devices. This configuration may be desirable because it extends tamperproof property of the present invention on top of the redundancy/performance properties of RAID.

Key generator 206 is an application running on system 100 that is used to generate the encryption keys used by the present invention. In particular, key generator 206 may be used to generate public key cryptography key pairs (or asymmetric keys), i.e., a public key and a private key. The private key is kept secret, while the public key may be widely distributed or exposed. The keys are related mathematically, but the private key cannot be practically derived from the public key. Key generator applications, such as keygen, are well known to those skilled in the art. Alternatively, one skilled in the art will recognize the system 100 may obtain public/private key pairs from an external source, such as Public Key Infrastructure or certificate authority.

FIG. 3 illustrates an exemplary process flow for storing data in a tamper-resistant manner. First, system 100 receives the data 300 and provides it to virtual block device 202. The data 300 may be from an application or user running on computer system 100. Alternatively, the data 300 may be from an external source requesting that system 100 protect it.

In addition, system 100 generates a private key 302 and a public key 304 for securing the data. As noted, these keys may be generated locally by key generator 206 or may be retrieved from an external source.

Second, virtual block device 202 processes data 300. In particular, virtual block device 202 buffers data 300 into blocks. For each block, virtual block device 202 then digitally signs the block using private key 302. For example, virtual block device 202 may perform a redundancy check or checksum on each block and encrypt it with private key 302. As another example, virtual block device 202 may hash the block of data and encrypt this hash value using private key 302. Virtual block device 202 may also provide information that indicates certainty about the date and time at which data 300 was digitally signed. In particular, virtual block device 202 may calculate a timestamp and hash the timestamp together with public key 304. The receipt may then indicate the timestamp in plain text with the hash value. Virtual block device 202 eventually passes the digitally signed blocks to real block device 304.

Third, real block device 304 writes the digitally signed block to storage device 114. Upon writing the block, real block device 304 may then notify virtual block device 202.

Fourth, once virtual block device 202 has confirmed that the block was written to storage device 114, several additional actions may be performed by virtual block device 202. In particular, virtual block device 202 will discard private key 302. Virtual block device 202 may discard private key 302 at various times. For example, virtual block device 202 may discard private key 302 after blocks for a complete file have been stored. Alternatively, virtual block device 202 may utilize private key 302 for a specific period of time and discard it after that time has lapsed. Virtual block device 202 may also discard private key 302 upon shutdown or startup of a particular application or upon shutdown or startup of system 100. One advantage of discarding private key 302 is that it protects the digital signatures from attack. Hence, an attacker will be unable to retrieve or derive private key 302 from system 100.

Virtual block device 202 may provide an acknowledgment when data has been received and securely stored. For example, virtual block device 202 may provide an application a "receipt" or other type of message. This receipt may include a copy of the public key 304 or may include a value derived from the public key 304. For example, virtual block device 202 may hash the public key 304 using a well known hashing algorithm, such as MD-5, SHA-1, and the like. Use of a hash of public key 304 may be useful because it produces a fixed length string as output.

In addition, virtual block device 202 may expose public key 304 to the source of the data or some other party or system. This allows another user or system to verify and retrieve data 300 from system 100.

Finally (fifth), virtual block device 202 is discarded from system 100. Virtual block device 202 may be discarded at various times. For example, virtual block device 202 may be discarded blocks for a complete file that has been stored. Alternatively, virtual block device 202 may be discarded after predetermined period of time has lapsed. Virtual block device 202 may also be discarded automatically upon shutdown or startup of a particular application or upon shutdown or startup of system 100.

FIG. 4 illustrates an exemplary process flow for verifying or retrieving data in accordance with the present invention. First, system 100 receives a request and determines if the request includes a public key 304 that is related to a discarded private key 302. For example, the request may include a copy of the public key 304 itself. Alternatively, the request may include a hash value of public key 304. System 100 will then look up the appropriate public key 304 based on this hash value.

Second, once system 100 has found the public key 304, system 100 will load the signed checksum data in block 300, and verify the signature using the public key 304. System 100 will also calculate a redundancy check or checksum of the data 300.

Finally (third), system 100 will compare the results of the decryption and the checksum. If the results match, then system 100 will indicate that the data has been verified as not being tampered. If the results do not match, then system 100 will indicate that the data has been tampered.

The virtual block device may have a file system layered on top of it, at read/write time, and later at read/only time. For the latter case, the virtual block device driver would run the algorithm described in FIG. 4, and return read errors to the file system when corruption/tampering was discovered. In this way the file system would be able to notify user-space program about the specific directories, files and ranges of bytes that have been tampered.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, implemented using a processor, of storing data in a tamper-resistant form, said method comprising:
   receiving the data;
   forming the data into blocks of data;
   digitally signing the blocks of the data based on a private key via a virtual block device;
   discarding the private key;
   storing the blocks of the data that were digitally signed via a real block device to a storage device;
   saving a long-term public key that corresponds to the private key that was discarded; and
   discarding the virtual block device.

2. The method of claim 1, wherein digitally signing the blocks of the data comprises signing checksums or hashes of the data with the private key.

3. The method of claim 1, wherein digitally signing the blocks of the data comprises:
   calculating redundancy check values for the blocks of the data; and
   signing the redundancy check values with the private key.

4. The method of claim 1, further comprising:
   calculating a hash value of the long-term public key that corresponds to the private key; and
   providing the hash value in an acknowledgment of receiving the data.

5. The method of claim 1, further comprising:
   calculating timestamps indicating when the blocks of the data were digitally signed;
   calculating hash values of the timestamps and the long-term public key that corresponds to the private key; and
   providing the hash values in an acknowledgment of receiving the data.

6. An apparatus comprising:
   a memory containing instructions; and
   a processor, operably connected to the memory, that executes the instructions to perform a method comprising:
   receiving data;
   forming the data into blocks of data;
   digitally signing the blocks of the data based on a private key via a virtual block device;
   discarding the private key;
   storing the blocks of the data that were digitally signed via a real block device to a storage device;
   saving a long-term public key that corresponds to the private key that was discarded; and
   discarding the virtual block device.

7. A non-transitory computer-readable storage medium comprising computer executable code for performing a method comprising:
   receiving data;
   forming the data into blocks of data;
   digitally signing the blocks of the data based on a private key via a virtual block device;
   discarding the private key;
   storing the blocks of the data that were digitally signed via a real block device to a storage device
   saving a long-term public key that corresponds to the private key that was discarded; and
   discarding the virtual block device.

8. A system having a tamper-resistant file system, said system comprising:
   a virtual block device configured to: receive data, form the data into blocks of data, digitally sign the blocks of the data based on a private key, preserve a long-term public key that corresponds to the private key, and discard the private key;
   a block device configured to: receive the blocks of data from the virtual block device, and write the blocks of data to a storage device; and
   a file system implemented on top of the virtual block device;
   wherein the virtual block device is configured as a temporary block device that is discarded by the system.

9. The system of claim 8, wherein the virtual block device is configured to provide the long-term public key to a source of the data that was received.

10. The system of claim 8, wherein the virtual block device is configured to digitally sign the blocks based on calculating redundancy check values for the blocks of the data and signing the redundancy check values with the private key.

11. The system of claim 8, wherein the virtual block device is configured to calculate a hash value of the long-term public key that corresponds to the private key and provide the hash value in an acknowledgment of receiving the data.

12. The system of claim 8, wherein the virtual block device is configured to calculate a timestamp indicating when the blocks of the data were digitally signed, calculate a hash value of the timestamp and the long-term public key that corresponds to the private key, and provide the hash value in an acknowledgment of receiving the data.

13. The system of claim 8, wherein the file system determines whether a block of data has been tampered by applying the long-term public key to a digital signature generated when digitally signing the blocks of the data.

14. A system having a tamper-resistant file system, said system comprising:
   a virtual block device configured to:
      receive data, form the data into blocks of data, digitally sign the blocks of the data based on a private key, preserve a long-term public key that corresponds to the private key, and discard the private key;
   a block device configured to:
      receive the blocks of data from the virtual block device, and write the blocks of data to a storage device; and
   a file system implemented on top of the virtual block device;
   wherein the virtual block device is further configured to discard the private key after a time interval.

15. A system having a tamper-resistant file system, said system comprising:
   a virtual block device configured to:
      receive data, form the data into blocks of data, digitally sign the blocks of the data based on a private key, preserve a long-term public key that corresponds to the private key, and discard the private key;
   a block device configured to:
      receive the blocks of data from the virtual block device, and write the blocks of data to a storage device; and
   a file system implemented on top of the virtual block device;
   wherein the virtual block device is further configured to discard the private key upon a shutdown of the system.

16. A system having a tamper-resistant file system, said system comprising:
   a virtual block device configured to:
      receive data, form the data into blocks of data, digitally sign the blocks of the data based on a private key, preserve a long-term public key that corresponds to the private key, and discard the private key;

a block device configured to:
  receive the blocks of data from the virtual block device, and write the blocks of data to a storage device; and
a file system implemented on top of the virtual block device;
wherein the virtual block device is further configured to discard the private key upon a startup of the system.

17. A computer-implemented method of verifying integrity of data stored in a computer system, wherein the data is associated with a digital signature created with a discarded private key, said method comprising:
  receiving a request for the data stored in the computer system
  determining, from the request, a long-term public key that is related to the discarded private key;
  decrypting the digital signature based on the long-term public key; and
  verifying the data based on the digital signature that was decrypted;
  wherein the discarded private key was discarded according to a condition selected from a group consisting of: upon completion of a time interval, upon a startup of the computer system, and upon a shutdown of the computer system.

18. The method of claim 17, wherein determining the long-term public key comprises:
  receiving a value that is based on a hash of the long-term public key; and
  identifying the public key based on the value.

19. The method of claim 17, wherein determining the long-term public key comprises:
  receiving a value that is based on a hash of the long-term public key and a timestamp indicating when the discarded private key was used; and
  identifying the public key based on the value and the timestamp.

20. The method of claim 17, further comprising propagating an error code when the verifying indicates that the data has been tampered.

* * * * *